(12) United States Patent
Niranjan et al.

(10) Patent No.: US 8,161,121 B2
(45) Date of Patent: Apr. 17, 2012

(54) APPLICATION DESIGN FRAMEWORK FOR MANET OVER A SHORT RANGE COMMUNICATION PROTOCOL

(75) Inventors: Niranjan, Richardson, TX (US); Guoxin Fan, Plano, TX (US); Mohan Reddy Duggi, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 11/831,344

(22) Filed: Jul. 31, 2007

(65) Prior Publication Data
US 2008/0270554 A1    Oct. 30, 2008

Related U.S. Application Data

(60) Provisional application No. 60/913,641, filed on Apr. 24, 2007.

(51) Int. Cl.
*G06F 15/16* (2006.01)
(52) U.S. Cl. .................. 709/206; 709/207; 709/230
(58) Field of Classification Search .................. 709/206, 709/207, 230
See application file for complete search history.

(56) References Cited

U.S. PATENT DOCUMENTS

| | | | | |
|---|---|---|---|---|
| 2003/0108062 | A1* | 6/2003 | Agrawal et al. | 370/463 |
| 2006/0128402 | A1* | 6/2006 | Lee et al. | 455/464 |
| 2007/0274273 | A1* | 11/2007 | Grushkevich et al. | 370/338 |
| 2008/0081663 | A1* | 4/2008 | Kasslin et al. | 455/557 |
| 2008/0192806 | A1* | 8/2008 | Wyper et al. | 375/133 |
| 2008/0318630 | A1* | 12/2008 | Gil | 455/561 |

OTHER PUBLICATIONS

Duggi, Mohan Reddy, et al.; "Architechture for MANET over Bluetooth"; U.S. Appl. No. 11/760,123, filed Jun. 8, 2007; Specification 23 pgs.; 4 Drawing Sheets (Figs. 1-5).
Niranjan, et al.; "Automatic Discovery and Connectivity Protocol for Bluetooth Scatternet Formation"; U.S. Appl. No. 11/770,519, filed Jun. 28, 2007; Specification 38 pgs.; 20 Drawing Sheets (Figs. 1-21).

* cited by examiner

*Primary Examiner* — Mohamed Wasel

(57) ABSTRACT

A system and method for designing applications for a device in a Bluetooth-based MANET (mobile ad hoc network) is provided. The method includes providing an application having an event module and a plurality of protocol modules. The method includes specifying whether the application will execute in either a high or low priority thread. The method also includes specifying whether high priority threads execute with one of an unblocking status and a best effort status, and specifying whether lower priority threads execute with one of a blocking status, the unblocking status, and the best effort status.

20 Claims, 4 Drawing Sheets

APPLICATION DESIGN FRAMEWORK FOR MANET OVER A SHORT RANGE COMMUNICATION PROTOCOL

CROSS-REFERENCE TO RELATED APPLICATIONS

The present application claims the benefit under at least 35 U.S.C. §119(e) of U.S. Provisional Application No. 60/913,641 filed Apr. 24, 2007 and entitled "Application Design Framework for MANET Over Bluetooth", inventors Niranjan et al. and which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional local area networks (LANs) typically have a central server that acts as a controller and coordinator for data traffic among the clients in the network. Communication between clients in a traditional LAN typically does not occur directly from one client to another. Instead, data might be sent from a client to the server and then from the server to another client. The server might also handle the logging in of clients, the synchronization of the activities of the clients, and other centralized control functions.

SUMMARY

In one embodiment, a method for designing applications for a device in a Bluetooth-based MANET (mobile ad hoc network) is provided. The method includes providing an application having an event module and a plurality of protocol modules. The method includes specifying whether the application will execute in either a high or low priority thread. The method also includes specifying whether high priority threads execute with one of an unblocking status and a best effort status, and specifying whether lower priority threads execute with one of a blocking status, the unblocking status, and the best effort status.

In another embodiment, a system in a Bluetooth-based MANET (mobile ad hoc network) is provided. The system includes a first and second wireless device. The first wireless device has a first application. The first application has an event module and a plurality of protocol modules. The second wireless device has a second application. The second application has an event module and a plurality of protocol modules. The first device is configured to execute the first application and the second device is configured to execute the second application such that the first and second applications communicate using data packets having a header portion identifying the protocol module to which the data packets are associated.

In another embodiment, a method of communication by applications on devices in a Bluetooth-based MANET is provided. The method includes, on each wireless device, providing an event module and a plurality a protocol modules each associated with one of a plurality of applications. The method includes transmitting data packets between specific applications on different devices by an associated protocol module of the specific application including a header of the data packet that identifies the data packet as associated with the specific application. The method includes the event module receiving the data packet and routing the data packet to the appropriate application based on the header.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
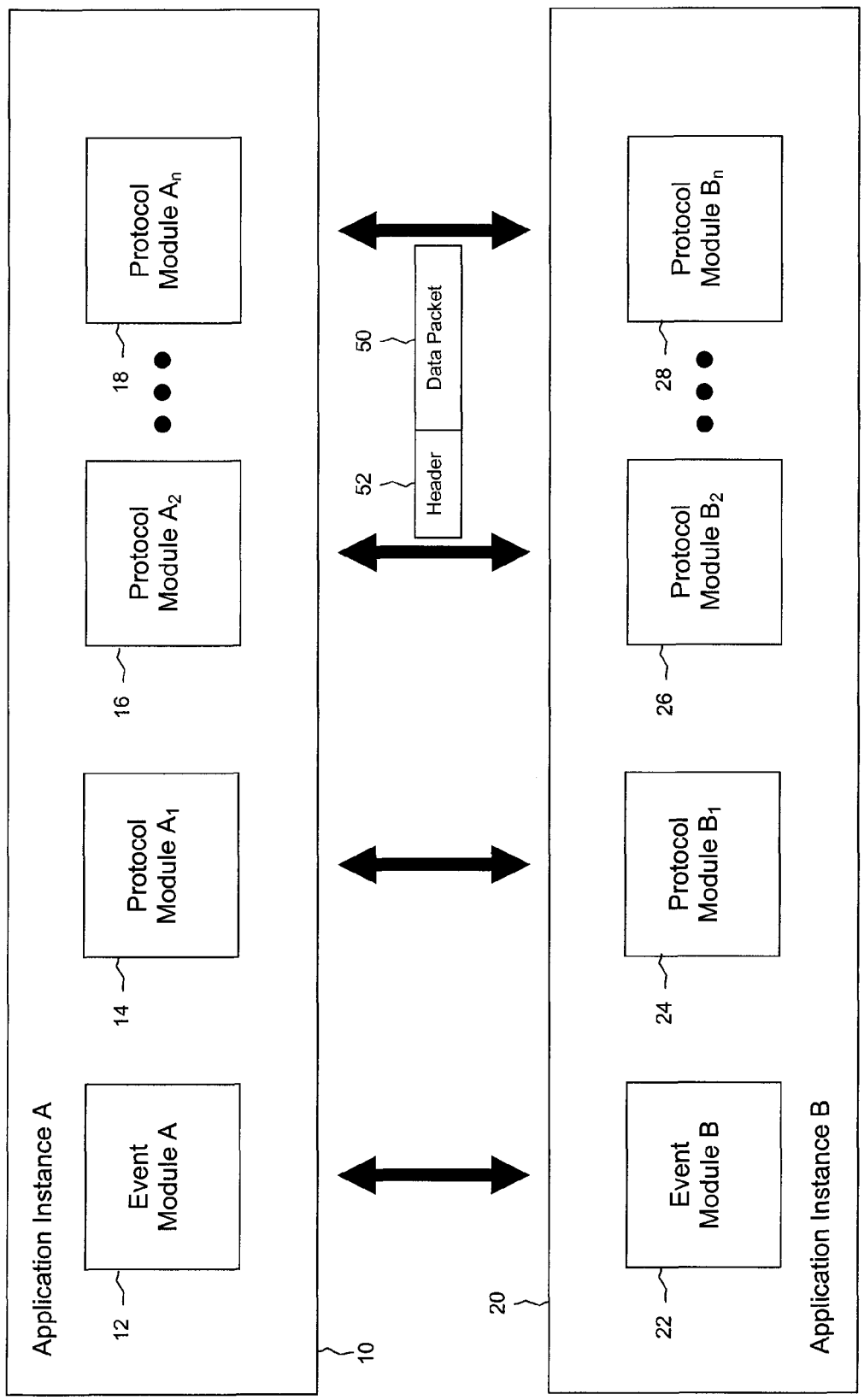
FIG. 1 is a diagram of two instances of an application designed according to an embodiment of the disclosure.

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A mobile ad hoc network (MANET) can be defined as a group of wireless computing devices capable of communicating directly with one another without a server acting as a central coordinator or scheduler for the data traffic between the devices. A MANET typically comprises a plurality of wireless devices such as laptop computers, handheld computers, mobile phones or mobile handsets, personal digital assistants, and similar devices. The devices might be capable of communicating with one another via a well-known wireless data transfer protocol, such as Transmission Control Protocol/Internet Protocol (TCP/IP).

A network in which wireless devices communicate with one another via the Bluetooth protocol is known as a piconet and a group of connected piconets is known as a scatternet. Since there is no central controller in a scatternet, the devices in a scatternet might periodically communicate with one another in order to establish the paths over which data will travel between the devices.

Applications, such as chat applications, data transfer applications, and social networking applications that might include chat, data transfer, and other features, can execute on the devices in a scatternet. The applications might send data to one another such as user-generated information or files stored on one of the devices.

A single application on one device might send different types of data to its counterpart application on another device.

For example, a social networking application that has a chat feature and a file transfer feature might need to transmit chat-related data and file transfer-related data substantially simultaneously to an instance of the social networking application on another device. Alternatively, the data transmitted between instances of an application might include a control portion that describes how the data should be transmitted, a payload portion that contains the actual data to be transmitted, and other types of data.

There is typically only one data path or data stream between any two neighboring devices in a scatternet. Therefore, different types of data that need to be transmitted substantially simultaneously are typically multiplexed by the transmitting device onto a single data stream. The receiving device then demultiplexes the data upon receiving the data stream. After demultiplexing the data, the receiving device typically inspects each data packet to determine the type of data the packet contains. For example, in the social networking application, the receiving device might determine whether the data packets contain chat-related data or file transfer-related data. The receiving device might then distribute the packets appropriately to a processing component for the chat-related data and a processing component for the file transfer-related data.

In an embodiment, an application design framework is provided for the applications that execute on the devices in a scatternet. Applications created under this framework contain an event module and a plurality of protocol modules. Each protocol module in an application is designed to send and receive one type of data to and from its counterpart protocol module in another instance of the same application on another device.

FIG. 1 illustrates an embodiment of two instances of an application created under this application design framework. The application might be, for example, a social networking application that includes chat, data transfer, and other features, or some other type of application that includes multiple modules for sending and receiving disparate types of data. Each instance of the application would typically execute on a different device in a scatternet. A first instance 10 of the application contains a first event module 12 and a first plurality of protocol modules $A_1$ 14, $A_2$ 16, through $A_n$ 18. A second instance 20 of the application contains a second event module 22 and a second plurality of protocol modules $B_1$ 24, $B_2$ 26, through $B_n$ 28. Protocol module $A_1$ 14 exchanges a single type of data with protocol module $B_1$ 24, protocol module $A_2$ 16 exchanges a single type of data with protocol module $B_2$ 26, and so on.

When a scatternet is being formed or when a device is joining an existing scatternet, the devices register with one another to specify the type of data they will exchange. For example, if protocol module $A_1$ 14 and protocol module $B_1$ 24 process chat-related data, the devices on which protocol module $A_1$ 14 and protocol module $B_1$ 24 reside might register with one another to specify that protocol module $A_1$ 14 and protocol module $B_1$ 24 will exchange chat-related data. After registering, protocol module $A_1$ 14 and protocol module $B_1$ 24 might send chat-related data directly to one another when the users of the devices use the chat portion of the social networking application. In light of the present disclosure, other examples of application programming interfaces that the protocol modules 14, 16, 18, 24, 26, and 28 might use when registering with one another and when exchanging data with one another will readily suggest themselves to one skilled in the art.

Multiplexing and demultiplexing might still occur for the data packets that pass between application instance A 10 and application instance B 20. However, in an embodiment, the protocol modules do not need to inspect the received data packets to determine what type of data the packets contain. The data type would already be known since each protocol module sends and receives only one type of data.

In an embodiment, each data packet 50 includes a header 52 that identifies the source device of the packet, the destination device of the packet, and an identifier for the sending and receiving protocol modules. Counterpart protocol modules in different instances of an application would, in an embodiment, have the same identifier. This can be contrasted with prior data transfer protocols, such as TCP, where a source port number might differ from a destination port number. The identifier might be established during the registration process for the protocol modules. In this way, a data packet can be sent to the appropriate protocol module without the need to inspect the contents of the packet to determine the protocol module to which the packet should be sent.

Figure 2:
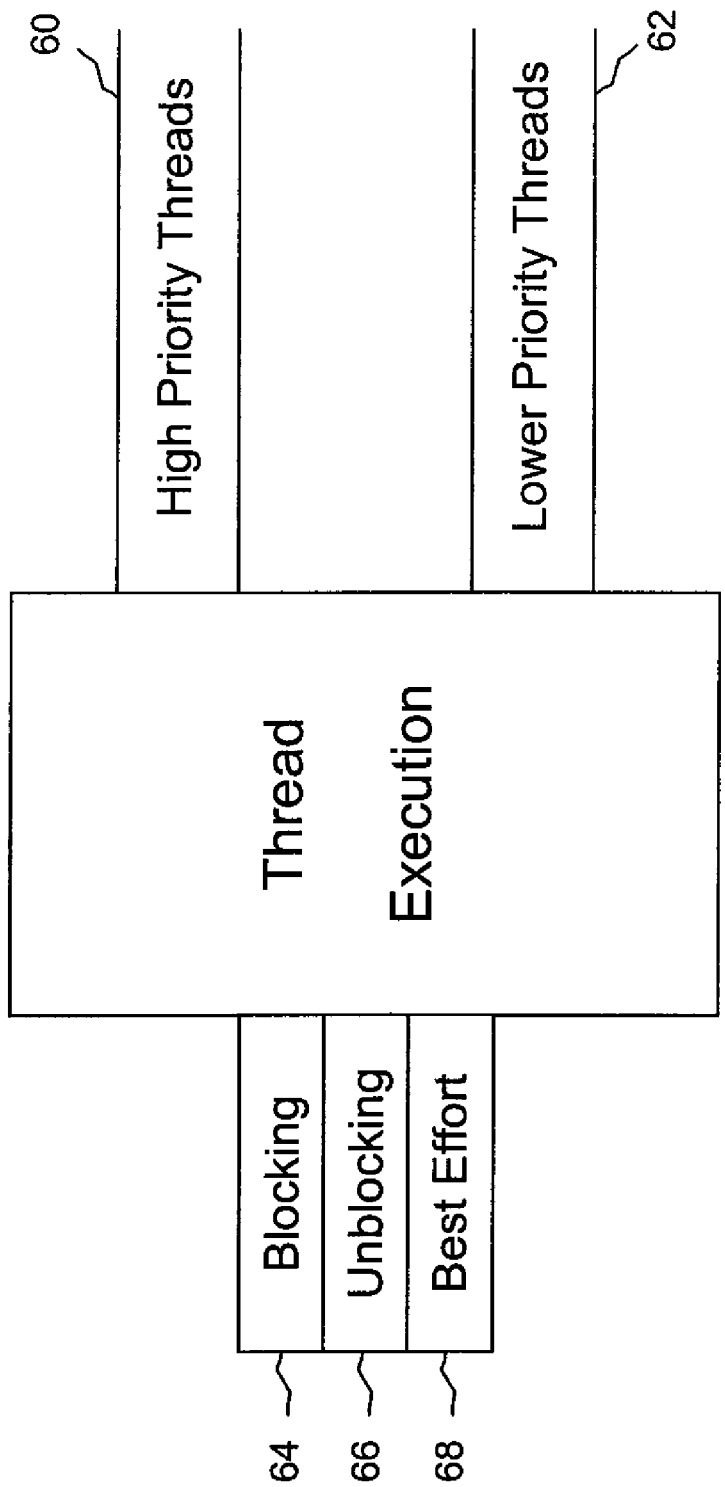
FIG. 2 illustrates thread execution according to one embodiment of the present disclosure.

It is well known in the art that multiple activities within a single application can execute concurrently if the activities execute in different threads. In an embodiment, as illustrated in FIG. 2, the application design framework allows an application designer to select a thread in which an application will execute. The threads available to the application designer include a high-priority thread 60 in which activities related to the management of the scatternet execute and one or more lower priority threads. Each of the threads can have a different priority or one or more threads can have the same priority but, in an embodiment, the scatternet management thread has the highest priority 60. This allows the application designer to place higher priority tasks in the scatternet management thread and lower priority tasks in lower priority threads 62.

In an embodiment, the application designer can specify data packet handling instructions for a thread, wherein the handling instructions specify whether the thread will have a blocking 64, unblocking 66, or best effort 68 status. When a thread is in the blocking status, no data packets can be transmitted on that thread. When a thread is in the unblocking status, a request to send a packet is made before the packet is actually sent. If a buffer to which the packet is being sent is available, an indication will be given that the packet can be sent and the packet is then sent. If the buffer to which the packet is being sent is full, thus preventing the packet from being sent, an indication will be given that the packet cannot be sent. If the buffer later becomes available, an indication will be given at that time that the packet can be sent and the packet is then sent. When a thread is in the best effort status, a packet is transmitted without a request to send the packet first being made. If a buffer to which the packet is being sent is available, the packet is sent to the buffer and from there to its destination. If the buffer to which the packet is being sent is full, the packet is dropped. In the best effort status, no indications are sent regarding whether or not packets can be transmitted.

In an embodiment, only the unblocking status and the best effort status are available for the scatternet management thread. For the other, lower priority threads, the blocking status, the unblocking status, and the best effort status are available. That is, the blocking status is available in the lower priority threads but not in the scatternet management thread. Therefore, data packets in lower priority threads can be blocked but data packets in the scatternet management threads cannot be blocked. This can prevent the inadvertent or malicious blocking of high-priority data packets and can ensure that the scatternet management thread executes without interruption.

In an embodiment, the event modules in each application manage the sending of the indicators regarding whether or not data packets can be sent. The event modules also handle events that occur to the devices in a Bluetooth-based MANET, such as connections, disconnections, and changes of roles.

Figure 3:
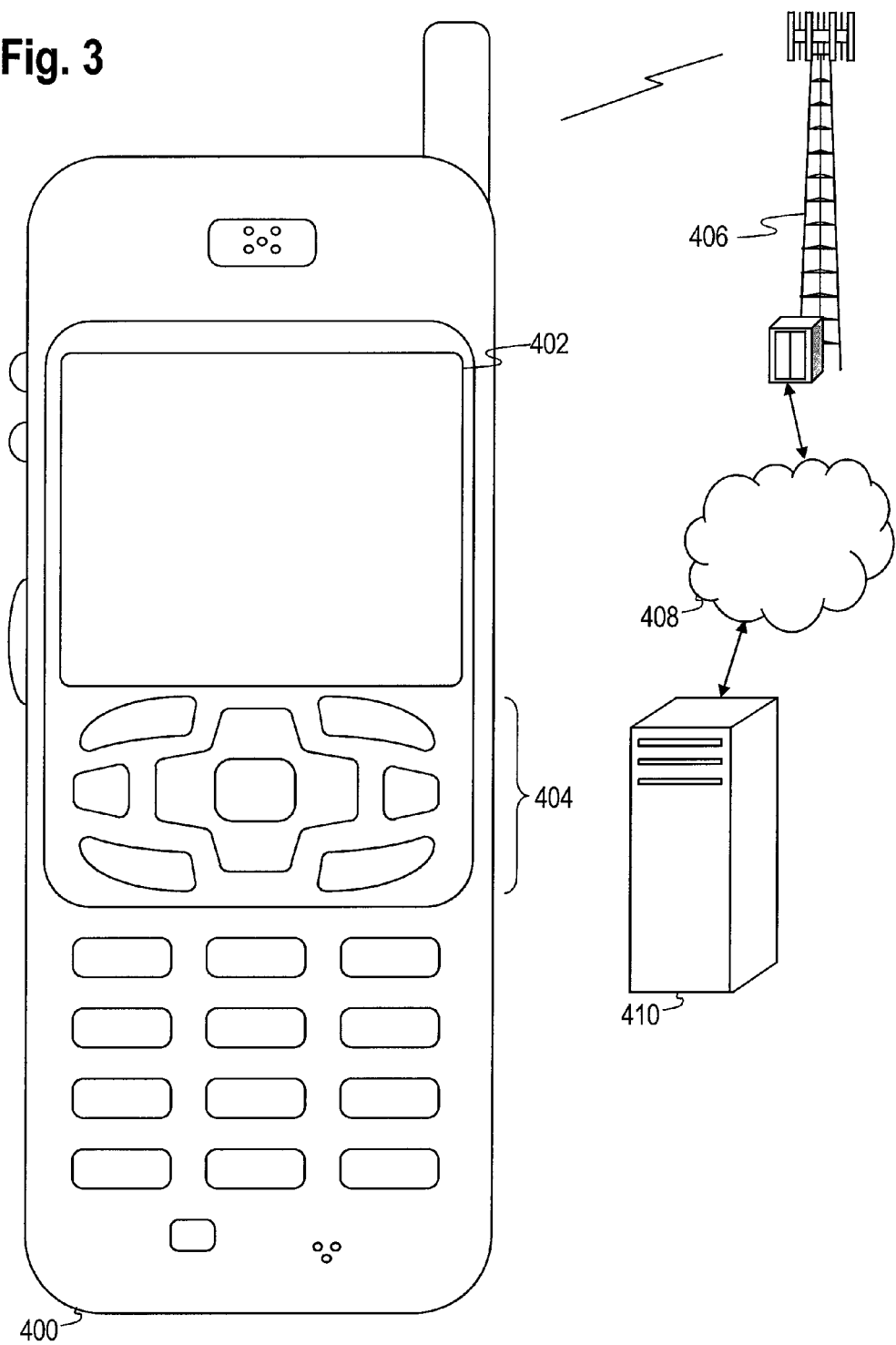
FIG. 3 is a diagram of a wireless communications system including a handset operable for some of the various embodiments of the disclosure.

FIG. 3 shows a wireless communications system including a handset 400 that may be operable for implementing aspects of the present disclosure, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset 400. The handset 400 may further execute one or more software or firmware applications in response to user commands. These applications may configure the handset 400 to perform various customized functions in response to user interaction.

Among the various applications executable by the handset 400 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 110.

Figure 4:
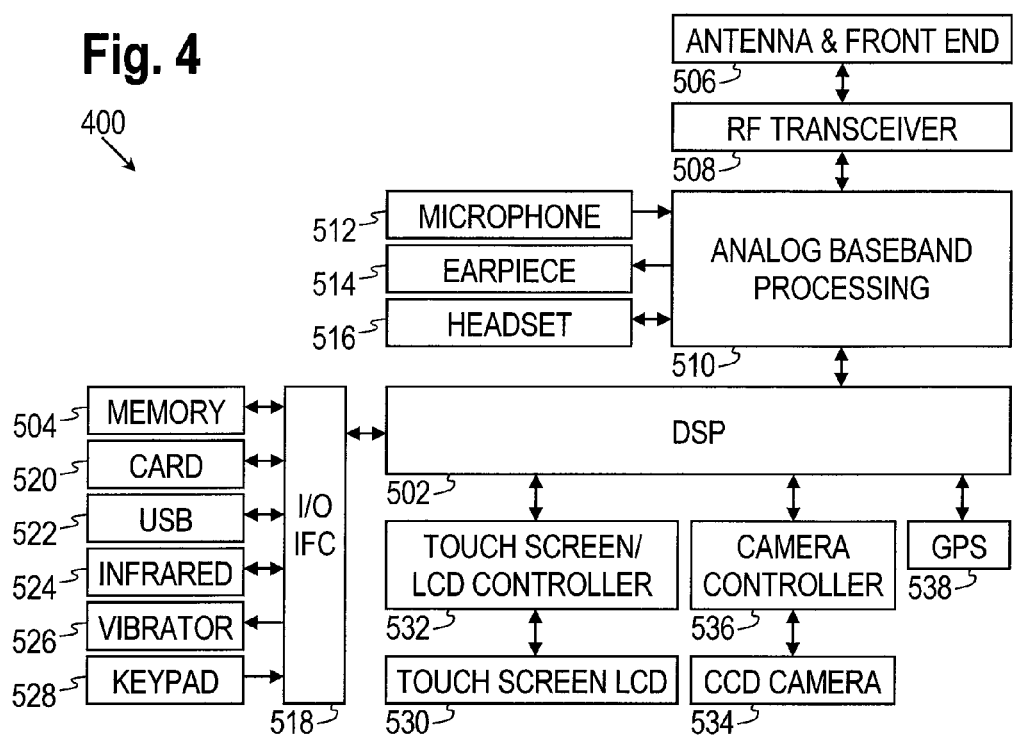
FIG. 4 is a block diagram of a handset operable for some of the various embodiments of the disclosure.

FIG. 4 shows a block diagram of the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. Various other peripherals may also be included to provide additional functions, e.g., radio and television reception.

Figure 5:
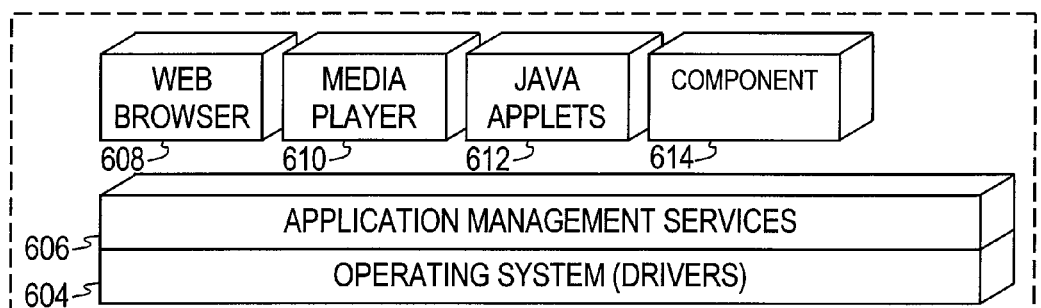
FIG. 5 is a diagram of a software environment that may be implemented on a handset operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG.

4 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality. A component 614 might provide functionality related to transmitting and receiving data packets in a scatternet.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for designing applications for a device in a Bluetooth-based MANET (mobile ad hoc network), comprising:
   providing an application for execution in a scatternet comprising a group of connected piconets having an event module and a plurality of protocol modules, wherein the event module manages the sending of indicators of data packets and handles events relating to connections, disconnections, and changing of roles;
   specifying whether the application will execute in either a high or low priority thread; and
   specifying whether high priority threads execute with one of an unblocking status and a best effort status, and specifying whether lower priority threads execute with one of a blocking status, the unblocking status, and the best effort status.

2. The method of claim 1, further comprising applications designed such that upon execution a plurality of data packets transmitted from a first protocol module in a first application to a second protocol module in a second application includes a single type of data.

3. The method of claim 2, wherein a header for the plurality of data packets includes an identifier that specifies that the plurality of data packets transmitted from the first protocol module are to be sent to the second protocol module.

4. The method of claim 2, wherein the event module manages an indicator that indicates whether one of the plurality of data packets can be sent from the first protocol module to the second protocol module.

5. The method of claim 1, wherein the high priority threads include management activities for the MANET.

6. A system in a Bluetooth-based MANET (mobile ad hoc network), comprising:
   a first wireless device having a first application for execution in a scatternet comprising a group of connected piconets, the first application having an event module and a plurality of protocol modules;
   a second wireless device having a second application, the second application having an event module and a plurality of protocol modules, the first device configured to execute the first application and the second device configured to execute the second application such that the first and second applications communicate using data packets having a header portion identifying the protocol module to which the data packets are associated, wherein first and second applications are configured to execute in one of a high and a low priority thread.

7. The system of claim 6, wherein when the a first protocol module of the first application sends a data packet to a first protocol module of the second application, the header portion of the data packets identify to the event module of the second application that the data packet is intended for the first protocol module of the second application.

8. The system of claim 7, wherein the event module configured to promote the appropriate protocol module receiving the appropriate data packet based only on the header of the data packet.

9. The system of claim 6, wherein the applications are further defined as social networking applications and including sub-application each having a protocol module, and wherein the sub-applications are selected from a group consisting of an email application, a chat application, and a file sharing application.

10. The system of claim 6, wherein high priority threads execute with one of an unblocking status and a best effort status, and wherein lower priority threads execute with one of a blocking status, the unblocking status, and the best effort status.

11. The system of claim 10, wherein management activities for the MANET execute in a high priority thread.

12. The system of claim 6, wherein when a specific thread has a blocking status, the data packets associated with that specific thread may be blocked.

13. The system of claim 6, wherein the data packets of the high priority thread may not be blocked.

14. The system of claim 6, wherein the first and second wireless devices are one of mobile communication devices, mobile phones, personal digital assistants, laptop computers, and tablet computers.

15. A method of communication by applications in devices in a Bluetooth-based MANET, comprising:
   on each wireless device, providing an event module and a plurality a protocol modules each associated with one of a plurality of applications, wherein the applications execute in one of a high and a low priority thread;
   transmitting data packets between specific applications in a scatternet comprising a group of connected piconets on different devices by an associated protocol module of the specific application providing a header of the data packet that identifies the data packet as associated with the specific application; and
   the event module receiving the data packet and routing the data packet to the appropriate application based on the header.

16. The method of claim 15, wherein high priority threads execute with one of an unblocking status and a best effort status, and wherein lower priority threads execute with one of a blocking status, the unblocking status, and the best effort status.

17. The method of claim 16, wherein management activities for the MANET execute in a high priority thread.

18. The method of claim 15, wherein the wireless devices are selected from a group consisting of mobile communication devices, mobile phones, personal digital assistants, laptop computers, and tablet computers.

19. The system of claim 15, wherein when a specific thread has a blocking status, data packets associated with the specific thread may be blocked.

20. The system of claim 15, wherein data packets of the high priority thread may not be blocked.

* * * * *